United States Patent [19]

Saunders et al.

[11] Patent Number: 4,672,168

[45] Date of Patent: Jun. 9, 1987

[54] APPARATUS FOR PERFORATING SHEET MATERIAL

[75] Inventors: Richard J. Saunders, San Jose; Derek L. Hine, Menlo Park; Gerald C. Barker, Palo Alto, all of Calif.

[73] Assignee: Coherent, Inc., Palo Alto, Calif.

[21] Appl. No.: 954,404

[22] Filed: Oct. 25, 1978

[51] Int. Cl.⁴ .............................................. B23K 26/00
[52] U.S. Cl. ..................... 219/121 LK; 219/121 LQ; 219/121 LT; 219/121 LY
[58] Field of Search ...................... 219/121 L, 121 LM

[56] References Cited

U.S. PATENT DOCUMENTS

4,218,606   8/1980   Whitman, III  .......... 219/121 LK X

Primary Examiner—C. L. Albritton
Attorney, Agent, or Firm—Limbach, Limbach & Sutton

[57] ABSTRACT

Apparatus is disclosed for forming plural rows of holes in a web of sheet material being advanced longitudinally along a unidirectional path of travel, the apparatus including a continuous wave laser and beam delivery apparatus. Beam delivering means delivers substantially the entire energy of the laser beam for predetermined periods of time to discrete web portions spaced apart across the web and includes means periodically interposed into and removed from the path of the laser beam for deflecting the beam periodically toward the web portions.

11 Claims, 25 Drawing Figures

APPARATUS FOR PERFORATING SHEET MATERIAL

BACKGROUND OF THE INVENTION

This invention relates to the art of perforating sheet material. More particularly, it relates to the art of perforating sheet material by directing a laser beam toward the sheet material to form holes therethrough. Even more particularly, it relates to the apparatus for forming multiple rows of such perforations along the length of the web of sheet material in a single pass. The apparatus of this invention is particularly suited for forming multiple rows of these holes or apertures through sheet material such as cigarette tipping paper.

In the prior art several techniques and types of apparatus have been used for perforating sheet material. Among these are the use of mechanical punches, electrical sparks, and projecting a laser beam through the apertures of a perforated drum over which the sheet material passes. In the tobacco industry most of the prior art techniques have, for various reasons, been found unsuitable or inefficient for perforating cigarette tipping paper. The perforations to be made in cigarette tipping paper are intended to control the delivery to the smoker of the cigarette smoke constituents by permitting air to be drawn in from the surrounding atmosphere to mix with the smoke during its passage through the filter structure. By controlling the mixing of the air and thus the delivery of the smoke constituents, various properties such as tar and nicotine levels in the cigarette can be regulated. Since the apertures are intended for the purpose of controlling such smoke constituent, it is important that the size and positioning of the holes be accurately controlled. Typically, these holes are on the order of 0.010 inches in diameter and spaced apart about 0.040 inches.

In attempting to achieve these desirable dimensions, the prior art structure has suffered numerous disadvantages. The most common type of prior art apparatus, mechanical pin punches, are extremely delicate in such a small size and frequently suffer damage to the punches themselves, as well causing tearing of the paper during perforating. The electric spark perforating apparatus burns holes in the paper, but may form irregular apertures and leave a charred edge around each aperture, both undesirable results.

One common type of prior art laser apparatus is exemplified in U.S. Pat. No. 3,808,394, in which a pulsed laser beam is directed toward a rotating mirror, which reflects the beam toward an opening in an independently rotating drum to vaporize the sheet material adjacent the opening. A more advanced form of laser apparatus is that disclosed in the co-pending Saunders et al. application, Ser. No. 670,113, which is assigned to the assignee of this application. The structure of Saunders et al. includes a rotating drum having apertures around its periphery, over which drum a narrow strip of the paper is passed. A continuous wave laser is directed against the interior of the drum periphery, projecting through the drum apertures to vaporize the sheet material adjacent thereto. The prior art laser apparatus has suffered from the disadvantage of low throughput and efficiency, since a single laser in that prior art is capable of forming only one row of apertures for each pass of the sheet material thereover. Accordingly, this prior art structure has generally been used, not with the 44 inch wide "parent" rolls of tipping paper, but with only a single bobbin of the paper having a width equivalent to that for only one, or at the most two, cigarette tips. In the rotating mask apparatus, the disadvantage has also flowed from the inefficient use of the continuous wave laser, in which only a portion of the output energy passes through the drum apertures to form holes, with the majority of the energy being reflected back to the laser or dissipated while performing no useful work. Obviously, the throughput of material could be increased dramatically if an entire parent roll, having paper of sufficient width for 32 cigarettes, could be perforated in a single pass through the perforating apparatus, and efficiency could be significantly improved if the entire energy of the laser beam could be utilized for perforating.

SUMMARY OF THE INVENTION

In view of the shortcomings of the prior art, it is an object of the present invention to overcome such disadvantages by providing a novel and improved laser perforating apparatus for reliably forming a plurality of rows of holes spaced transversely across the advancing web in a single pass of the web by the apparatus. It is a further object of the present invention to provide such apparatus in which substantially the entire energy of a continuous wave laser beam is utilized for such perforation.

In accordance with the present invention, there is provided apparatus including a continuous wave laser producing a substantially continuous laser beam and means for delivering substantially the entire energy of the laser beam for predetermined periods of time to discrete web portions spaced across the web. The beam delivering means includes means periodically interposed into and removed from the path of the laser beam for deflecting the beam periodically toward the spaced apart web portions, the energy of the laser beam delivered to each such web portion being sufficient to form a hole through the web thereat.

In a preferred embodiment of the present invention, the beam deflecting means includes a plurality of beam momentary folding elements, including a plurality of disc-like reflective choppers mounted for mutually synchronous rotation, with the individual reflective surfaces of each being in mutually parallel planes and angularly offset about their axes, with each such chopper corresponding to one of the rows of apertures to be formed in the sheet material.

BRIEF DESCRIPTION OF THE DRAWINGS

The foregoing objects, features and advantages of the present invention will become apparent from the following detailed description in which.

DESCRIPTION OF A PREFERRED EMBODIMENT

Figures 1, 2:
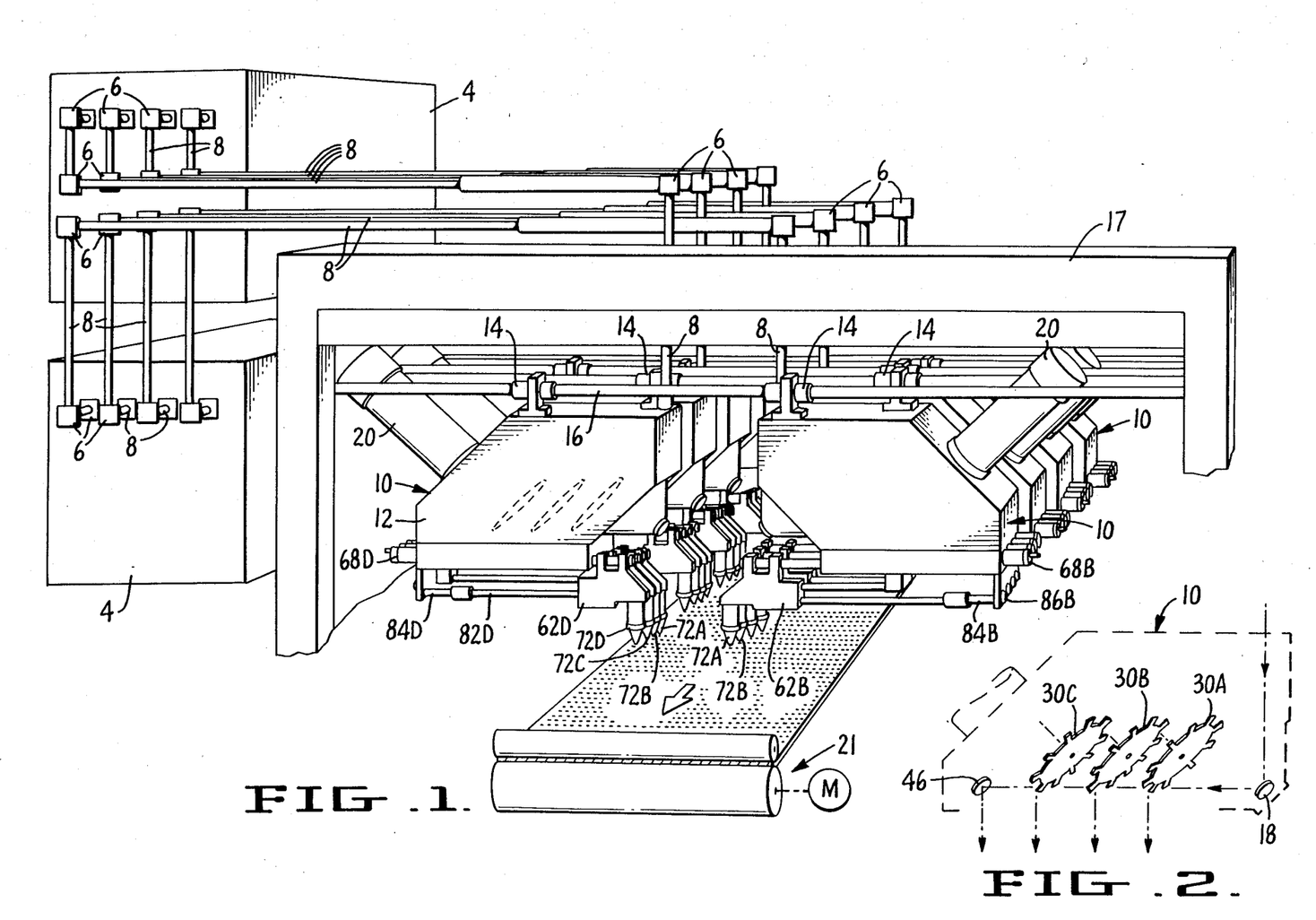
FIG. 1 is a perspective view of apparatus according to the teachings of this invention capable of forming 32 rows of holes in a web of sheet material in a single pass, such apparatus including 8 beam-directing modules.
FIG. 2 is a schematic representation of one of the beam-directing modules of the apparatus of FIG. 1.

A particularly preferred embodiment of the apparatus of this invention is illustrated in FIG. 1 as an apparatus capable of forming 32 parallel rows of apertures along a web of sheet material 2 during a single pass of that sheet material through the apparatus. In this apparatus are included a pair of continuous wave lasers 4, suitably of the type of the EVERLASE apparatus sold by Coherent, Inc. These lasers 4, in this preferred embodiment, each contain four continuous wave $CO_2$ laser heads 6. The output beam from each laser head 6 is directed through a telescoping tubular laser beam optical path enclosure 8 to its respective beam directing module 10.

Since the apparatus of FIG. 1 may be used satisfactorily with one, or eight, or any other number of these beam directing modules 10, and since each such module may suitably be a substantially identical to all the others, the configuration and operation will be described in detail here with respect to only a single such module 10. It is to be understood that the description applies equally to all of the other modules.

Figure 3:
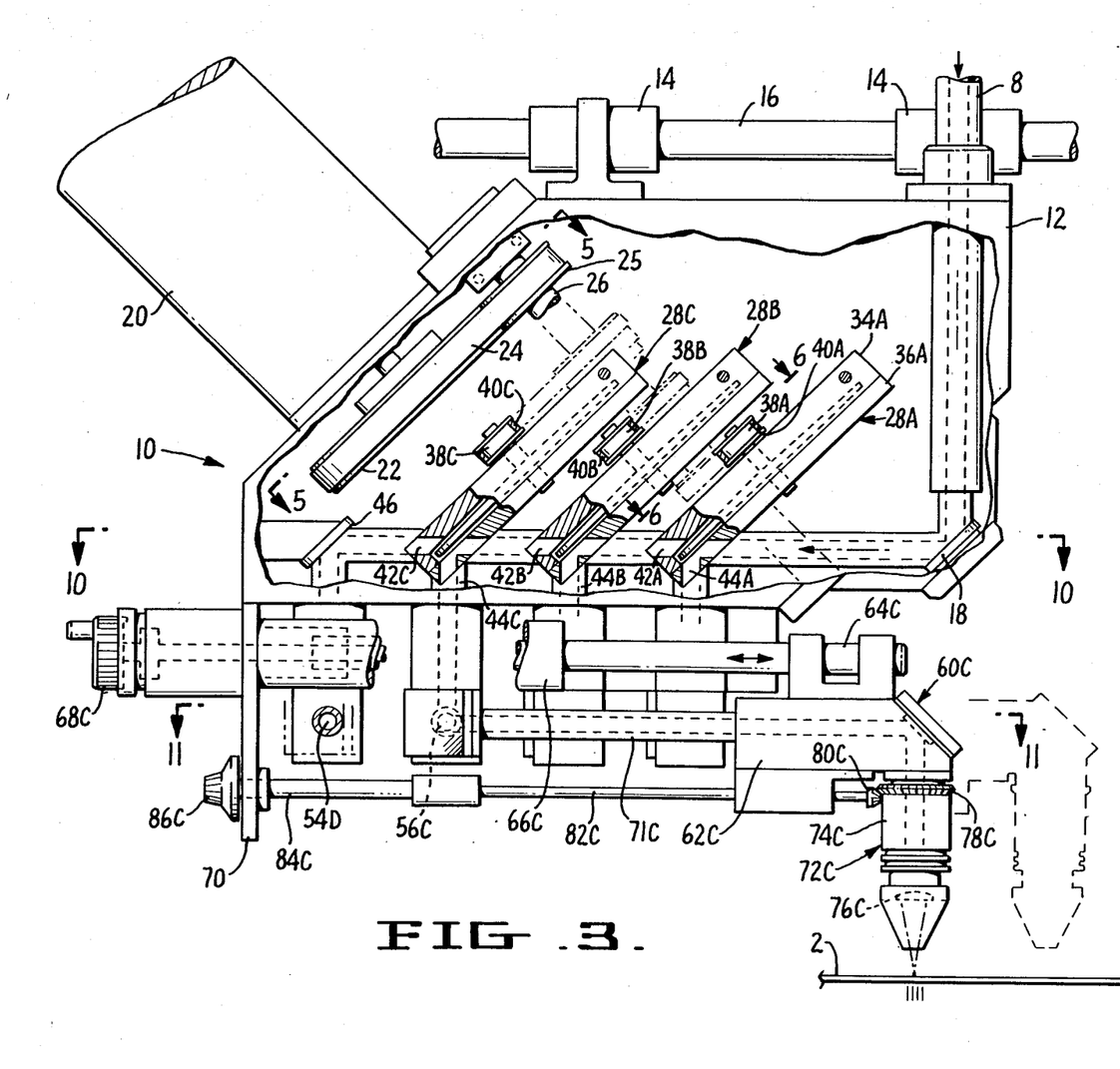
FIG. 3 is a side elevation, partially in section, of one of the beam-directing modules of the apparatus of FIG. 1.

The principal components of one of the beam delivery modules 10 is shown more clearly in the sectional side view of FIG. 3. The module includes a housing 12 mounted by suitable means, such as ball bushings 14, to a supporting member 16 which, in turn, is supported by main support frame 17. Adjacent the right hand end (FIG. 3) of the housing 12, the laser beam enclosure 8 enters that housing to conduct the laser beam thereinto. Directly below the beam enclosure 8 is fixed folding mirror 18 which deflects the laser beam from its vertical entry into the housing 12 into a horizontal direction, which is generally parallel to the plane of the web 2 to be perforated.

Mounted to the opposite end of the housing 12 is chopper drive motor 20, which preferably is an electric motor which is synchronized with the drive means 21, which is of conventional construction, conveying the web 2 along its unidirectional path of travel. A pulley 22 on the output shaft of the motor 20 is connected by suitable means, such as timing belt 24, to a pulley 25 affixed to master drive shaft 26, which is journaled to the housing 12.

Figures 8, 9:
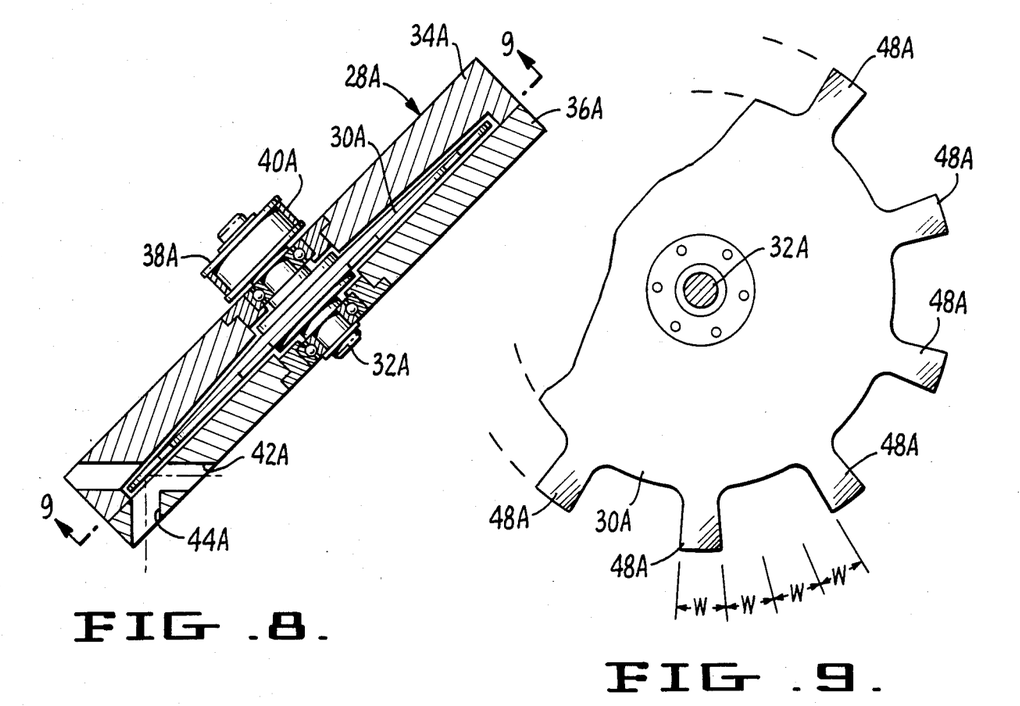
FIG. 8 is a side sectional view, at a slightly enlarged scale, of one of the choppers of the apparatus of FIG. 3.
FIG. 9 is a plan view of the chopper disc of FIG. 8, taken along line 9—9 of FIG. 8.

Intermediate the motor 20 and the beam enclosure 8 within the housing 12 are one or more, in this case three, chopper assemblies 28A, 28B and 28C, which may suitably be substantially identical one to another and configured as illustrated in FIG. 8, which is a side sectional view of first chopper 28A. It is to be understood that the components of the other chopper assemblies are substantially the same and with component parts numbered corresponding to those part numbers of assembly 28A in FIG. 8. This first chopper assembly 28A includes a chopper wheel of disc 30A rigidly affixed to a shaft 32A journaled in suitable bearings affixed to chopper housing members 34A and 36A which are fastened together by conventional means and which substantially enclose the disc-like chopper wheel 30A. The housing members 34A and 36A, in addition to being joined to one another, are also ridigly affixed to the housing 12 of the beam directing assembly, thus locating and attaching the chopper wheel 30A with respect to that housing. Affixed to one end of the shaft 32A is a pulley 38A, suitably adapted for use with a toothed timing belt 40A. This belt 40A also engages, in the manner illustrated in FIGS. 3 and 5, a suitable pulley 25 affixed to master shaft 26 in order that it may be driven by motor 20. Clapper assemblies 28B and 28C are similarly mounted and are driven by belt 40B and 40C.

All of the chopper assemblies 28A, 28B and 28C are mounted with their shaft and the planes of the chopper wheels 30A, 30B and 30C at an angle, suitably 45°, to the direction of the laser beam coming off of the folding mirror 18. Adjacent the lowermost extremity of each of the chopper assembly housings 34A–34C and 36A–36C are provided apertures 42A, 42B and 42C aligned with the laser beam coming off the folding mirror 18 and with the outer portion of the chopper wheels 30A–30C. Intersecting those apertures 42A–42C at 90° and projecting downwardly from the outer portion of chopper wheels 30A–30C are additional apertures 44A–44C, respectively.

To the left (in FIG. 3) of all of the chopper assemblies and aligned with folding mirror 18, is another fixed folding mirror 46, affixed to the housing 12, for purposes to be described below.

In FIG. 9 is illustrated chopper wheel 30A, which is substantially identical in construction to chopper wheels 30B and 30C. This structure is a generally disc-like member having portions 48A extending radially outwardly of the disc periphery at spaced locations. The portions 48A suitably all lie in a common plane, which preferably is generally parallel to the broad surface of the disc-like member 30A. Each of these portions 48A is suitably polished and coated to be highly reflective of the beams from lasers 4. Each of the beam reflective portions 48A preferably subtends a substantially equal angle about the axis of disc-like member 30A and is suitably spaced from its next circumferentially adjacent similar portion 48A a distance equal to the product multiplying the circumferential width W of any one of those portions 48A times the number of folding mirrors and chopper assemblies, other than first chopper assembly 28A, aligned with folding mirror 18. In this manner rotation of the chopper wheel 30A at a constant speed will periodically move each individual reflector portion 48A into the path of the laser beam off folding mirror 18 for periods of time substantially equal to that for each of the other reflector portions 48A. In this embodiment, there are two other chopper assemblies 28B and 28C and folding mirror 46 so aligned. Accordingly, the spacing between successive chopper wheel reflected portions 48A is equal to three times the width of each such reflective portion 48A, each of which is substantially identical in size. In this preferred embodiment, each of the chopper wheels 38A, 38B and 38C are identical in configuration and have ten substantially identical individual reflective portions 48A, 48B or 48C spaced around the periphery of each.

Figure 10:
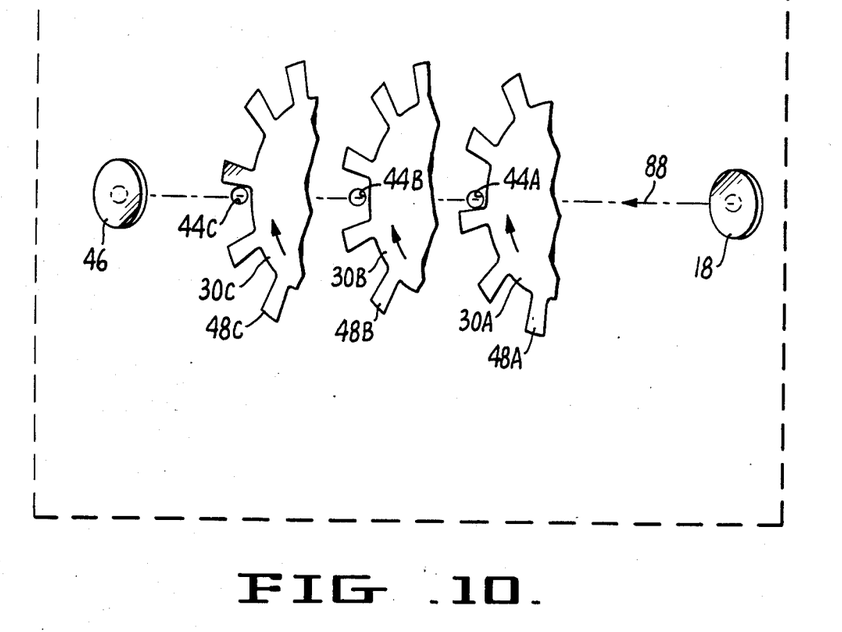
FIG. 10 is a fragmentary plan view of the apparatus of FIG. 10, taken along line 10—10.

While the reflective portions of each of the chopper wheels 30A, 30B and 30C lie in planes which are mutually parallel, each of these choppers 30A, 30B and 30C is angularly offset about its axis from the orientation of the others in the manner shown in FIG. 10, which is a sectional view taken along lines 10–10 of FIG. 3. In this schematic representation, it may be seen that the chopper wheel 30B is angularly offset the width of one reflective portion 48B from the rotational orientation of chopper wheel 30A. Chopper wheel 30C is rotationally offset a further amount equal to the angle subtended by one more reflected portion 48C from the alignment of 48B. As previously noted, the reflective portions 48A, 48B and 48C each subtend substantially equal angles about heir respective disc-like members 30A, 30B and 30C. By this rotational arrangement, it will be shown below that the laser beam is being intercepted and deflected at all times by one or more of the beam momentary folding elements which comprise folding mirror 46 and the chopper wheel individual reflective portions 48A, 48B and 48C. It should be noted that, while rotating chopper wheels are illustrated in the preferred embodiment, other well-known forms of beam chopping structures could be used equally well for periodically interposing into and removing from the beam path the desired beam deflecting elements.

Figures 5, 6, 7:
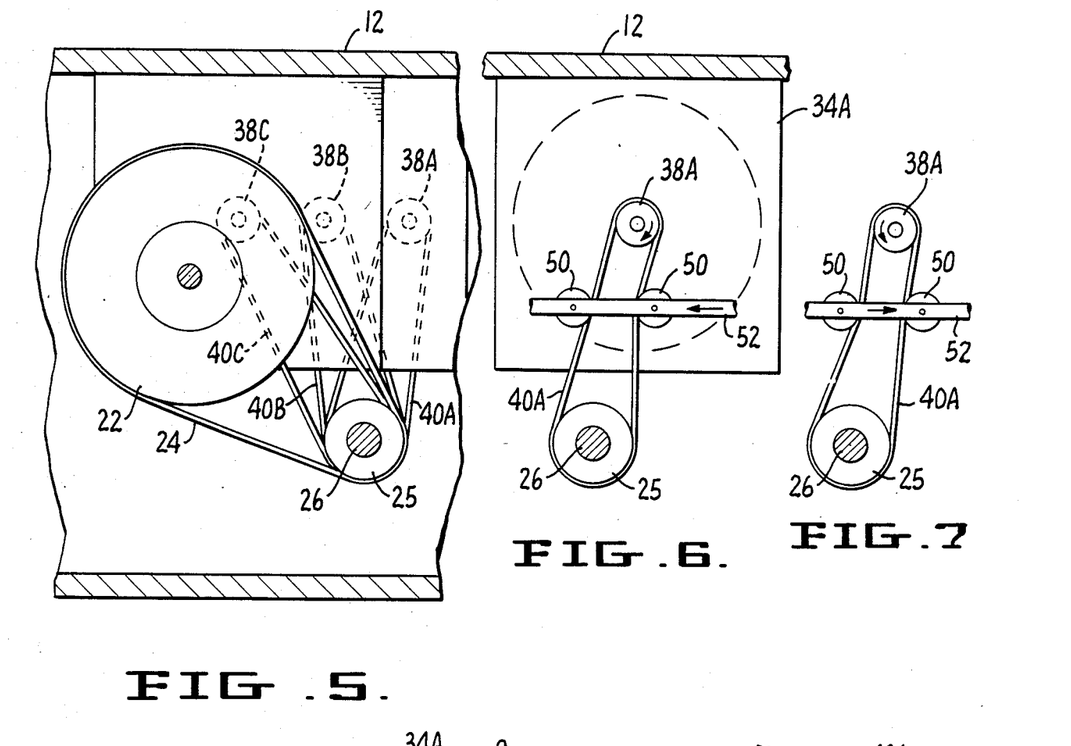
FIG. 5 is a sectional view taken along line 5—5 of FIG. 3.
FIG. 6 is a fragmentary sectional view taken along line 6—6 of FIG. 3 illustrating the angular position adjustment mechanism thereof.
FIG. 7 is a view of the apparatus of FIG. 6, with the angular position adjusting apparatus in a different position of adjustment.

While the three chopper wheels 38A, 38B, and 38C are closely aligned to the desired positioning of FIG. 10 when the wheels 30A, 30B and 30C and their respective drive pulleys are mounted to the shafts 32A, 32B and 32C, means such as that illustrated in FIGS. 6 and 7 are also provided in this embodiment for fine adjustments in rotational alignment of one chopper wheel to another. This fine adjustment structure, which is provided for each of the chopper assemblies, includes a pair of idler rollers 50 affixed to a member 52 to deflect the drive belt 40A (or 40B or 40C) slightly inwardly. This member 52 is mounted to chopper housing 34A by suitable adjustment means, such as a lead screw, to provide for movement to and fro in the direction indicated by the arrows. As illustrated in FIGS. 6 and 7, even when the master drive shaft 26 is held rigidly fixed, a slight rotation of chopper pulley 38A in a clockwise direction may be achieved by moving member 52 to the left. Similarly, an adjustment counter-clockwise may be achieved by moving the member 52 to the right, thus permitting fine adjustment of the rotational positions of each of the chopper wheels 30A, 30B and 30C.

Figure 11:
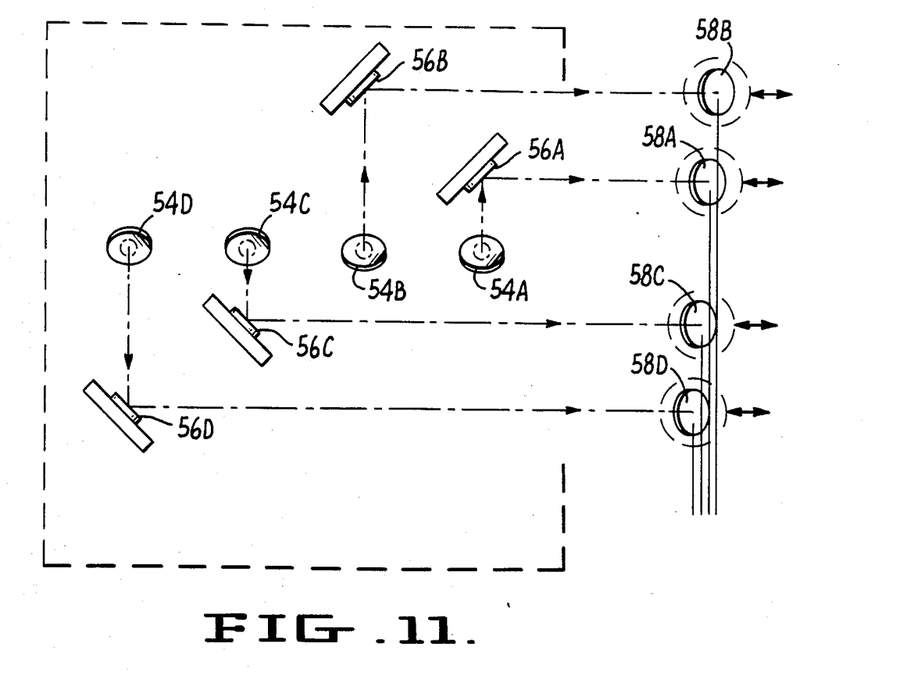
FIG. 11 is a fragmentary plan view of the apparatus of FIG. 3, taken along the line 11—11.

With reference again to FIG. 3, and also with respect FIG. 11, positioned below each of the downwardly facing assembly apertures 44A, 44B and 44C, and below fixed folding mirror 46 are longitudinal folding mirrors 54A, 54B, 54C and 54D, each of which will deflect any laser beam incident thereupon in a direction generally parallel to the longitudinal direction of the web 2. Aligned with these longitudinal folding mirrors 54A, 54B, 54C and 54D are respective transverse folding mirrors 56A, 56B, 56C and 56D, positioned to deflect a laser beam coming off the longitudinal folding mirrors toward a direction transverse of the web 2.

Aligned with transverse folding mirrors 56A, 56B, 56C and 56D, are downward folding mirrors 58A, 58B, 58C and 58D, these downward folding mirrors each being mounted within a beam positioning and focusing assembly 60A, 60B, 60C or 60D. Assembly 60C is illustrated in detail in FIG. 3. This assembly 60C includes a housing 62C affixed to a support shaft 64C which is supported by and movable relative to housing 12 in the direction indicated by the arrows on shaft 64C in FIG. 3. This support shaft 64C is received into support housing 66C which is affixed to the module housing 12, and within which the shaft 64C may move in the direction indicated by the arrows. A vernier and lead screw arrangement 68C joins support shaft 64C to a bracket 70 on housing 12 and provides for accurately controllable and predeterminable amounts of movement of the shaft 64C with respect to housing 12, and thus transverse of the web 2. A beam enclosure 71C extending from transverse folding mirror 56C is telescopingly received into housing 62C.

Figure 4:
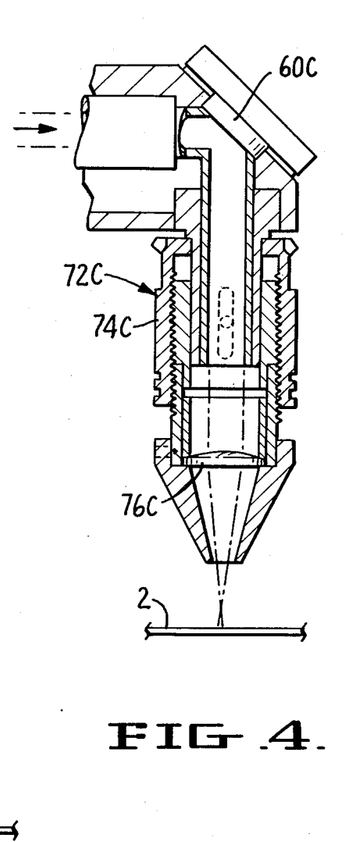
FIG. 4 is a side sectional view, at a slightly larger scale, of the focusing optics of the module of FIG. 3.

Extending downwardly from the housing 62C is the final focusing optics assembly 72C which includes a suitable housing 74C bearing appropriate focusing lens or lenses 76C. The position of the focusing lens 76C is adjustable, for adjusting the focus of the laser beam exiting therethrough by means of a suitable threaded arrangement, shown in FIG. 4. The focus of this assembly may be adjusted remotely from the other end of the module 10 by means of the engagement between ring gear 78C and bevel gear 80C which, in turn, is affixed to shaft 82C. Shaft 82C is telescopingly received within outer shaft 84C, which may be controlled by vernier 86C attached to bracket 70 below the head positioning vernier 68C. Thus, the position of the focusing head 72C transversely of the web 2 and the focal point of the laser beam exiting from assembly 72C may both be adjusted precisely in predetermined amounts to predetermined positions by suitable manipulation of verniers 68C and 86C, which are positioned to facilitate such adjustment during operation of the equipment while the web 2 is being advanced past the beam directing apparatus. This precise, fine adjustment is in addition to the coarse transverse positioning of the module 10 which may be effected by moving the entire module on its ball bushings 14 longitudinally of the support member 16. It is to be understood that one of the beam directing assemblies 60C and focusing assembly 72C is provided to cooperate with each of the transverse folding mirrors 56A, 56B, 56C and 56D.

In FIGS. 12–17C are schematically illustrated the steps in forming apertures of differing shapes, as well as sizes, in the web 2 through the manipulation and control of the various elements of the apparatus of this invention. In these figures, the apparatus is schematically illustrated with the various folding mirrors deleted for simplicity of explanation, the only optical elements shown being the chopper wheel 30A with its individual reflective portions 48A and the focusing lens arrangement schematically illustrated by lens 76A.

Figures 12, 13, 14:
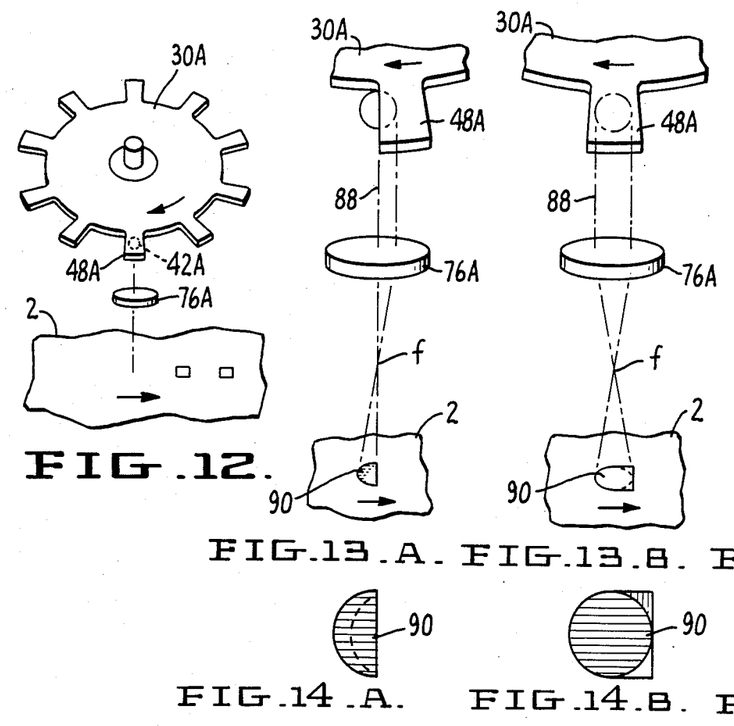
FIG. 12 is a schematic representation of the interrelation between the beam chopper, the direction of movement of the web of sheet material and the hole configuration of the apparatus of this invention, in which the beam deflecting portion of the chopper disc periphery moves in a direction opposite that of the web.
Figures 13, 14:
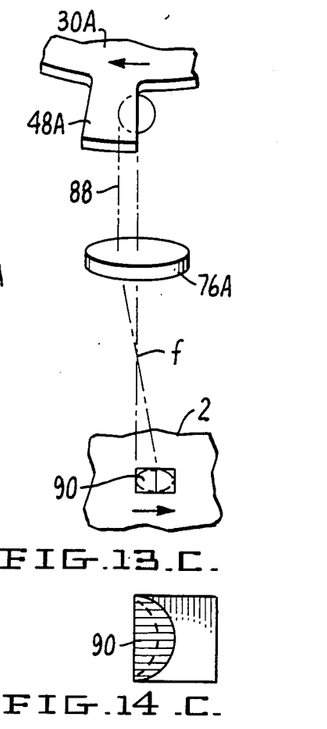
FIGS. 13A–13C are fragmentary representations the apparatus of FIG. 12, illustrating the steps in the formation of a hole having a generally rectangular configuration.
FIG. 14A–14C are schematic representations of the portions of the beam impinging upon the web during the steps shown in FIGS. 13A–13C.

In FIG. 12 and in FIGS. 13A, 13B and 13C, and 14A, 14B and 14C, are illustrated the results of operating this apparatus with the web 2 moving in a direction generally opposite the direction of the beam reflecting portion of the periphery of the chopper wheel 30A, with the web below the focal point f of the focussed laser beam 88. In the configuration shown in FIG. 13A the portion of the beam first exposed to the paper is a flat-sided portion defined by the leading edge of the chopper wheel reflective portion 48A. As the web 2 continues to move past the fixed laser spot directed thereupon, the chopper wheel 30A continues to rotate in a direction indicated by the arrow. This continued rotation, in FIG. 13B, brings the full width of chopper wheel reflective portion 48A across the incoming laser beam 88 to deflect that entire, generally circular, beam onto the web, as illustrated in FIG. 13B. As the web continues to move, and the chopper wheel 30A continues to rotate, FIG. 13C shows that the final portion of the laser beam deflected by chopper wheel 30A to this particular spot has a trailing edge that is generally squared off, as defined by the trailing edge of the chopper wheel reflective portion 48A. Thus is formed a generally rectangular aperture 90 through the web 2. The steps in the formation of this aperture 90 are illustrated also in FIGS. 14A, 14B and 14C, corresponding to the events of FIGS. 13A, 13B and 13C, respectively. As noted above, the leading edge of one of the beam reflective portions 48B of the second chopper wheel 30B is rotationally positioned immediately adjacent the trailing edge of first chopper wheel reflective portion 48A. Thus, as the trailing edge of first chopper reflective portion 48A is rotated out of engagement with the beam, as in FIG. 13C, one of the reflective portions 48B of the second chopper 30B will be rotated into position intercepting the beam 88, thus to form an aperture in another position on the web in the same manner that the aperture 90 was formed. Continued rotation will cause corresponding events to occur with third chopper wheel 30C and with fixed folding mirror 46, each of them thus forming such generally rectangular apertures.

Figures 15, 16:
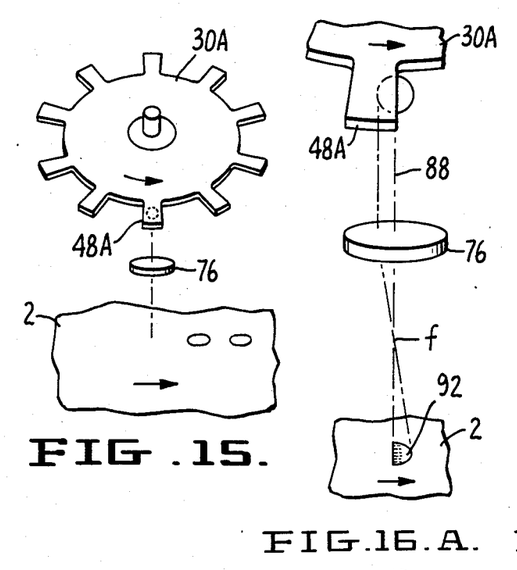
FIG. 15 is a schematic representation of the interrelationship between the chopper disc and the web of sheet material in which the beam deflecting portion of the disc periphery moves in substantially the same direction as the movement of the web.
Figure 16:
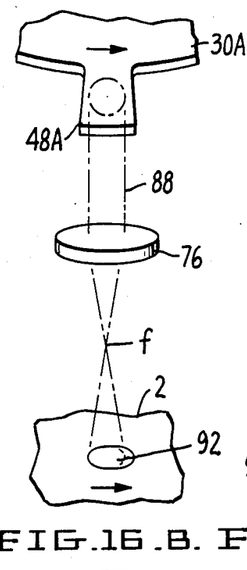
FIGS. 16A–16C schematically represent the steps in the formation of an ongated oval shaped hole by the apparatus of this invention.
Figure 17:
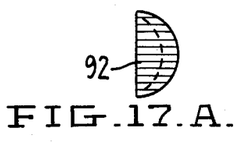
FIGS. 17A–17C illustrate the portions of the laser beam impinging upon the web during the steps of 16A–16C.

The results of rotating the chopper wheel such that the laser beam is reflected off portion 48A moving in the same general direction as the web 2 are shown in FIG. 15 and in FIGS. 16A, 16B, 16C and in FIGS. 17A, 17B and 17C, again in a configuration in which the web 2 is positioned below the focal point f of the laser beam 88. As shown in FIG. 16A, the leading edge of the aperture 92 formed in this configuration is that defined by the rounded periphery of the generally circular cross-section laser beam 88 and not that of the straight edge of the chopper wheel beam reflective portion. Thus, the leading edge of the aperture 92 will be generally rounded also. In FIG. 16B, the continued rotation of the chopper wheel 30A and movement of the web 2 brings the full, generally circular, illumination of the laser beam onto the web 2. Then, in FIG. 16C, the trailing edge of the aperture 92 is defined by the opposite rounded side of the generally circular laser beam 88, causing the trailing edge of the aperture 92 also to be rounded. Thus, as shown in FIGS. 17A, 17B, and 17C, this configuration will produce an elongated or generally oval configuration of aperture 92.

Since the configurations of FIGS. 13A, 13B and 13C and FIGS. 16A, 16B and 16C both involve the positioning of the web 2 of sheet material below the focal point f of the laser beam, it should be apparent to those skilled in the art that the beam reversal effected by the focusing element 76A would provide for the formation of the generally square ended apertures 90 of FIG. 14C, if the chopper wheel rotation and web movement direction were that of FIGS. 15 and 16A, 16B and 16C and the web *above* the focal point f of the laser beam. Similarly, the rounded end apertures of FIG. 17C could be formed by the rotation and web movement configuration of FIG. 12 and FIGS. 13A, 13B and 13C if the web 2 were positioned above the focal point f. Obviously, the length of the aperture 90 or 92 can be changed by varying the relative speed of movement between the web 2 and the rotation of chopper wheels 30A–30C. Thus, by all of these adjustments, both the size and configuration of the hole formed through the web 2 may easily be controlled and changed.

From all the foregoing, the manner of operation of the apparatus of this invention may now be seen more clearly. Each laser head 6 produces a continuous wave laser beam 88, which is carried through its beam enclosure 8 to one of the modules 10. Within that module 10, the laser beam 88 is directed generally parallel to the lontitudinally moving web 2 toward the folding mirror and chopper assemblies which comprise the beam momentary folding elements. Each such beam momentary folding element corresponds to one of the portions of the web 2 where a longitudinal row of holes is desired to be formed. This laser beam then goes to a first beam chopper assembly 28A having a disc-like chopper wheel 30A having beam reflective portions which, through rotation of the chopper wheel, are periodically interposed into and removed from the path of the laser beam. When such a reflective portion 48A is interposed into the path of laser beam 88, it deflects that laser beam downwardly to longitudinal folding mirror 54A over to transverse folding mirror 56A and then to downward folding mirror 58A. From folding mirror 58A the beam is directed through the focusing optics 76C which focus the beam as desired onto the web 2. As the chopper wheel 30A continues to rotate, removing its beam reflective portion from a position intercepting the beam, the voids or beam transmissive portions of that chopper wheel permit the beam to be continued on to the next beam momentary folding element, which, in the preferred embodiment, is the second chopper assembly 28B. At this second chopper assembly this same general pattern of beam folding, focusing and directing occurs to provide a second row of apertures longitudinally of the web 2. As the individual beam reflective portion of that second chopper wheel 30B continues its rotation out of the path of the laser beam, that beam is then passed onto the third chopper wheel 30C, which provides in a similar manner for a third row of holes longitudinally of the web moving past the apparatus. As that third chopper wheel individual beam reflective portion is rotated out of interception with the laser beam 88, the beam then continues on to the fixed folding mirror 46, which serves in an analagous manner to provide for a fourth row of holes longitudinally of the web 2. Continued rotation of the chopper wheels 30A, 30B and 30C then will bring the next individual beam reflective portion of the first chopper wheel 30A into interception with the laser beam, thus starting the sequence over again to form a second aperture longitudinally aligned with the immediately preceding aperture formed by the apparatus associated with chopper wheel 30A.

In the preferred embodiment of this invention, described in detail above, there are provided three rotating chopper wheels and one fixed folding mirror. It should be apparent to one skilled in the art that any number of parallel chopper wheels could be used with this apparatus to form a greater or lesser number of rows of apertures along the web from each module 10. In FIG. 1 a particularly preferred embodiment of this apparatus is illustrated incorporating eight such modules each having four output beams and thus providing for creation of 32 rows of apertures along the web during a single pass of the web beneath the perforating apparatus. In this particularly desired apparatus, each laser beam is provided with approximately 150 watt continuous wave output, with the chopper wheels rotating at a speed of about 10,000 rpm, thus providing for the formation from each module of 100,000 apertures per minute. These apertures normally may be nominal dimensions of about 0.010 inches be 0.010 inches and be spaced on 0.040 inch centers through a paper thickness 0.002 inches with the paper moving at about 300 feet per minute. The relative spacing of the rows of apertures transversely of the web 2 may be adjusted at any time by moving the modules 10 along their supports 16 and by adjusting the verniers 68 to move the individual beam directing heads 62 transversely of the web and of one another. Such an arrangement has been found satisfactory to enable the laser to form the desired apertures through the web 2.

While a particularly perferred embodiment of the apparatus of this invention has been described above in detail, it is to be understood that this description is intended to be illustrated only of the principles of this invention and is not to be considered limitative thereof. Since numerous other variations and modifications, all within the scope of the invention, will readily occur to those skilled in the art, this invention is to be limited solely by the claims appended hereto.

What is claimed is:

1. Apparatus for forming plural rows of holes in a web of sheet material being advanced longitudinally along a unidirectional path of travel, comprising a continuous wave laser producing a substantially continuous laser beam;

beam deflecting means for delivering substantially the entire energy of said continuous laser beam to said unidirectionally advancing web, said beam deflecting means delivering said beam for predetermined periods of time to discrete web portions spaced apart transversely across said web, the energy of said laser beam delivered to each said web portion being sufficient to form a hole through the web thereat, whereby plural rows of holes spaced transversely across the web are formed longitudinally along the web as the web advances past the apparatus, and wherein the beam deflecting means includes a plurality of choppers, each chopper including a disc having radially extending, beam reflective portions at spaced apart locations, said reflective portions being generally parallel to one of the broad surfaces of said disc, said disc being mounted for rotation about an axis positioned at an angle to said beam such that rotation of said disc will move successive reflective portions thereof into and out of exposure to the lader beam, and wherein said plurality of choppers are mounted for mutally synchronous rotation with the individual reflective surfaces of each being in mutually parallel planes and with the respective axes of rotation of the discs being offset from each other, such that the laser beam is deflected with cyclical repetition successively off individual reflective portions of successively positioned said choppers whereby the laser beam is delivered to the web periodically from each of the choppers.

2. The apparatus of claim 1 further comprising means selectively changing the shape of said holes.

3. The apparatus of claim 2 wherein said hole shape changing means comprises means for selectively determining which portion of said laser beam will first impinge upon said web at each said hole.

4. The apparatus of claim 3 wherein said hole shape changing means comprises means for changing the direction of said chopper movement.

5. The apparatus of claim 3 wherein said hole shape changing means comprises means for changing the speed of said chopper movement.

6. The apparatus of claim 3 wherein said hole shape changing means comprises means for changing the point where said laser beam is focused relative to the plane of said web.

7. The apparatus of claim 1 wherein said beam deflecting means includes means for selectively changing the location of said web portions transversely of said web to predetermined different locations, whereby the positions of the rows of holes transversely of the web may be changed.

8. The apparatus of claim 7 wherein said beam deflecting means comprises means for selectively changing said location, while said web is being advanced past said beam deflecting means.

9. The apparatus of claim 1 wherein said beam deflecting means comprise, in addition to said choppers, a fixed folding mirror, whereby the fixed folding mirror receives and deflects the laser beam when no chopper reflective portion is deflecting the beam.

10. The apparatus of claim 9 wherein said disc reflective portions each subtend substantially equal angles about said disc and are spaced apart, one from the next, a distance equal to the product of the circumferential width of one said disc reflective portion times the number of said choppers plus the folding mirror.

11. The apparatus of claim 1 wherein the axes of rotation of the choppers are parallel to each other.

* * * * *